H. DARWIN, DEC'D.
K. DARWIN, ADMINISTRATRIX.
INCANDESCENT GAS BURNER.
APPLICATION FILED FEB. 24, 1910.
1,006,442.
Patented Oct. 17, 1911.
3 SHEETS—SHEET 1.
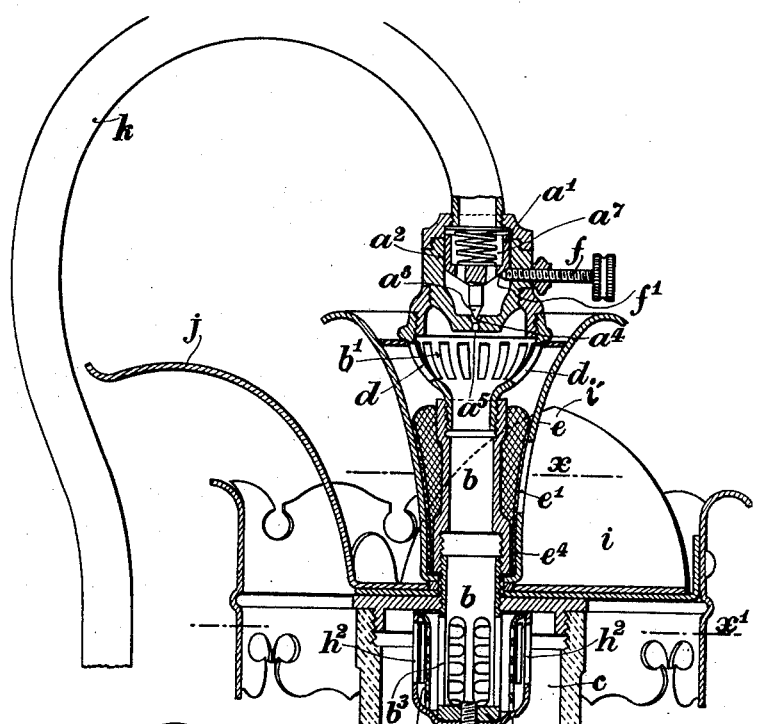
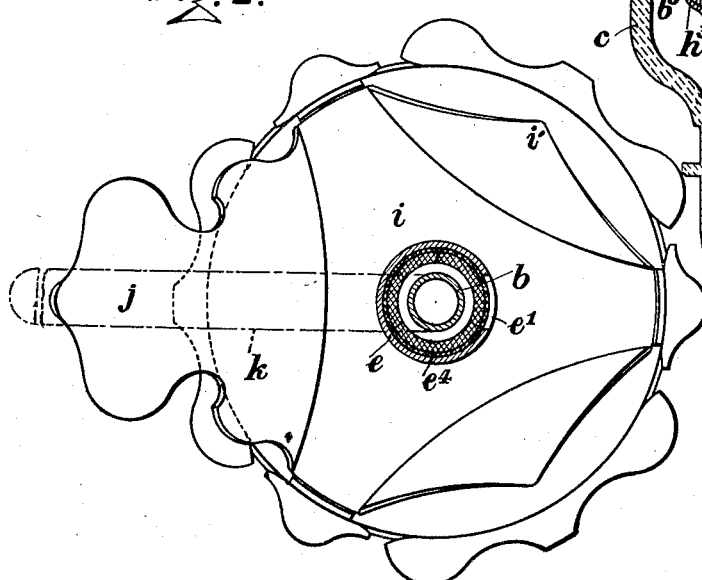
WITNESSES
INVENTOR
Kate Darwin
Administratrix Estate of
Harry Darwin Deceased
By James L. Norris
Atty H. DARWIN, DEC'D.
K. DARWIN, ADMINISTRATRIX.
INCANDESCENT GAS BURNER.
APPLICATION FILED FEB. 24, 1910.
1,006,442.
Patented Oct. 17, 1911.
3 SHEETS—SHEET 2.
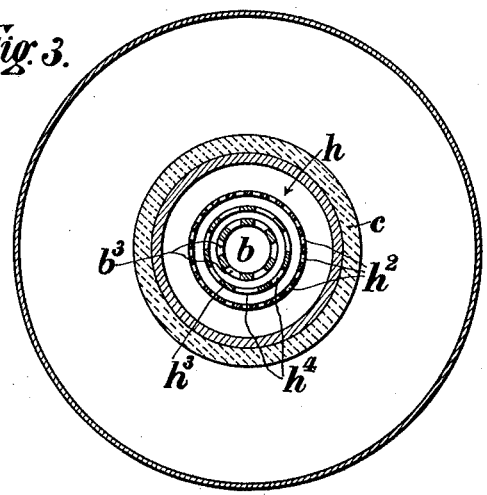
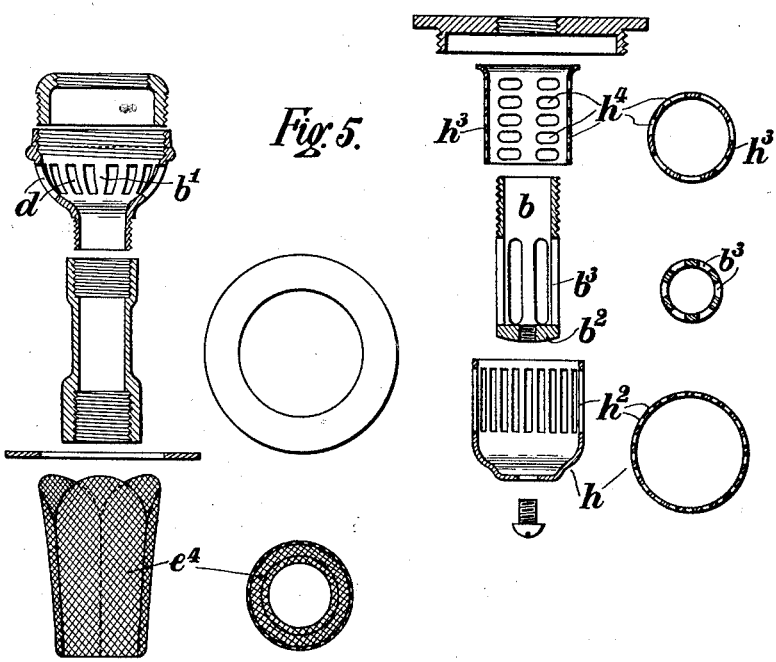
WITNESSES
INVENTOR Harry Darwin Deceased
Kate Darwin
Administratrix Estate of
By James L. Norris
Atty H. DARWIN, DEC'D.
K. DARWIN, ADMINISTRATRIX.
INCANDESCENT GAS BURNER.
APPLICATION FILED FEB. 24, 1910.
1,006,442.
Patented Oct. 17, 1911.
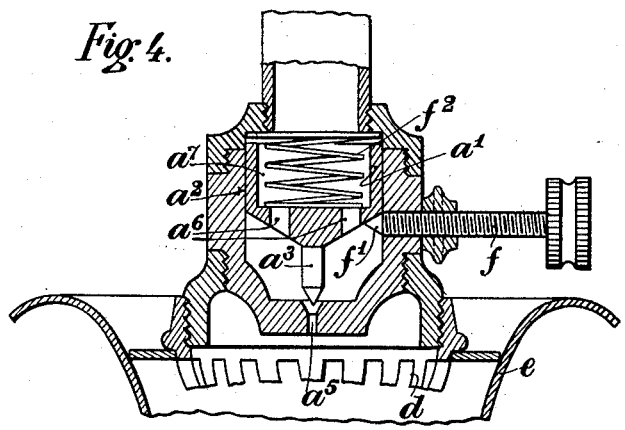
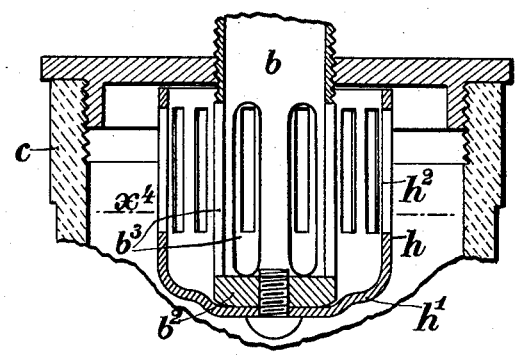
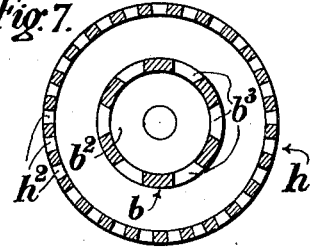

UNITED STATES PATENT OFFICE.

HARRY DARWIN, DECEASED, LATE OF BIRMINGHAM, ENGLAND; KATE DARWIN, ADMINISTRATRIX.

INCANDESCENT GAS-BURNER.

1,006,442.  Specification of Letters Patent.  Patented Oct. 17, 1911.

Application filed February 24, 1910. Serial No. 545,693.

*To all whom it may concern:*

Be it known that HARRY DARWIN, deceased, late a subject of the King of Great Britain and resident of 41 Kingsbury road, Gravelly Hill, Birmingham, England, and of whose estate his widow, KATE-DARWIN, is the administratrix, did invent certain new and useful Improvements in Incandescent Gas-Burners, of which the following is a specification.

This invention has relation to inverted incandescent gas burners of the type in which there is interposed between the gas-service pipe and the gas-and-air induction tube, a gas regulator which is operated externally by a screw or other mechanical device for the purpose of varying the area of the gas-passage into the induction tube and thereby adapting the burner to suit the particular supply-pressure of the richness or character of the town gas which is to be burned therein.

The object of the present invention is to provide an improved burner which embodies a regulator of the above referred to type, and is adapted to produce a thoroughly atomized and perfectly combustible mixture of gas and regeneratively heated air, and to deliver such mixture to the point of ignition in such a condition that when burned in contact with an incandescent mantle, the maximum illuminating value of the gas is attained.

According to my said invention the gas-regulator is constructed so as to deliver the gas in a vertical straight line or axially into an induction tube which is supplied with regeneratively-heated air from a hot air jacket surrounding the said induction tube; the said gas and heated air being thence conveyed to an atomizing and mixing device which is inclosed within a mixing chamber communicating with the burner nozzle.

Figure 1 of the accompanying drawings represents a complete vertical section of a single-light inverted incandescent gas burner constructed in accordance with my invention. Fig. 2 is a horizontal section of Fig. 1, taken upon the dotted line $x$ and looking downwardly. Fig. 3 is another horizontal section, taken upon the dotted line $x^1$, Fig. 1, through the mixing chamber and the gas-and-air atomizing or incorporating devices. Fig. 4 is an enlarged sectional view of the gas-regulator, separately. Fig. 5 shows various views of some of the separated or disassembled component parts of the improved burner. Fig. 6 is a vertical section of a modified atomizing and mixing arrangement, and Fig. 7 is a cross section of the same upon the dotted line $x^4$.

In the burner shown in Figs. 1 to 5, $a$ is the adjustable gas-regulating valve and $b$ the induction tube leading to the mixing and expansion chamber $c$; $d$ are the air inlet holes in the upper part of the said tube and $e$ is the jacket or casing which, except that it has an air-inlet at $e^1$, is sealed or closed, so that air admitted into the annular chamber between said jacket and the induction tube has no escape other than by way of the openings $d$ into the said tube. The gas-regulating arrangement comprises a perforated piston $a^1$ located within a cylindrical box or chamber $a^2$ and carrying at the center of its underside, a small conical stud or valve $a^3$ which is concentric with a correspondingly coned seating $a^4$ that is formed in the middle of the bottom of the valve box and leads to an outlet passage or aperture $a^5$ communicating with the induction tube $b$ whose upper end is secured to the said valve box. The perforated piston of the valve (whose perforations or gas passages are marked $a^6$) has a good sliding fit within the box so that the valve stud is kept always in line with, or concentric with, the coned seating or outlet, which is itself arranged in exact alinement with the axis of the induction tube.

Regulators are known in which a sliding piston or equivalent part is provided with a conical valve which, by its position relative to a seating or hole in the regulator box, determines the quantity of gas that can, at a given pressure, pass through the clearance between the valve and seating into the induction tube. But in all these known arrangements, the seating or hole is so shallow that the tendency of the gas, immediately on clearing the valve, is to spread toward the walls of the induction tube, or to take a direction other than an axial one, which is found to be detrimental to the inductive effect exerted by the said gas upon the air supply and to militate against the regular intake of air and the production of a perfectly combustible mixture. But in the improved burner herein described this disadvantage or defect is obviated by so constructing the bottom of the valve box that the natural tendency of the gas to spread on clearing the conical valve surfaces is counteracted and the said gas is projected axially and in a straight vertical line down the induction tube. For this purpose, the coned valve seating $a^4$ is extended into a parallel-sided or cylindrical outlet passage $a^5$ of considerable length, which is arranged in the same vertical axis as the center of the induction tube and concentrically with respect to the air inlets in the upper part of the induction tube, and therefore, in addition to preventing the spreading of the gas as it passes the valve seating, it also serves as a guide which keeps the gas stream in a straight axial line and thus enables the said gas to exert an effectual and equal inductive action upon each of the air-inlets.

The back or topside of the piston may be hollowed or annularly chambered at $a^7$ so that it may serve as a dust-trap. In order to raise or lower the piston within the valve box and thereby alter the position of the valve cone relative to the seating and correspondingly adjust the size of the gas passage past the said valve, the underside of the said piston is coned or formed with an inclined surface, while the valve box carries an adjusting screw $f$ whose inner end extends through the walls of said box and has its tip $f^1$ which may be coned or rounded, impinging against the said inclined surface of the piston. Further, the said piston is acted upon by a spring $f^2$ whose tendency is to force the same toward the bottom of the box and take the valve cone into the seating and reduce the area of the gas passage way or orifice to the minimum. By virtue of this arrangement, when the screw $f$ is turned in a direction that will cause its tip to travel inward, its action on the incline lifts the piston and valve against the spring and correspondingly increases the area of the gasway leading to the guide extension $a^5$ whereas when the screw is backed out, the piston and valve are depressed by the spring and the said passage way between the valve and seating is restricted accordingly. Lock-nuts on the screws or any other suitable provision may be adopted for securing the piston to the valve body after adjustment. Obviously any other suitable mechanical arrangement may be adopted for adjusting or setting the gas-regulating valve and fixing it after such adjustment.

Referring again to the general arrangement of the burner; the induction tube is cupped, enlarged or expanded at the upper end so as to form, immediately below the axial gas inlet $a^5$, an air-induction or intake chamber $b^1$ which has curved walls or gradually contracts in diameter down to the body of the tube, and is pierced with a circular series of slits or apertures $d$ wherethrough air is drawn into the said chamber and passes thence with the stream of gas down the body of the tube to the system of expansion and mixing chambers of the burner. These apertures $d$ are concentric to the gas passage $a^5$. The whole of the said tube, including the perforated air-intake chamber at its upper end, is inclosed within a casing $e$ of suitable form and is thus surrounded by annular air jacket or chamber. This casing is provided, at or near its lower end (or at some distance below the perforations or air holes $d$ in the air in-take chamber of the induction tube) with the air inlet $e^1$ (or with two or more air inlets), of sufficient size to admit the maximum quantity of air required by the burner, but in other respects, the said chamber is sealed or closed so that the air passing thereinto cannot escape but is constrained to ascend and enter the induction tube by way of the apertures $d$. In the construction shown, the top of the jacket is closed by a plate $e^2$. As the chamber surrounding the induction tube and its air-intakes is situated within the hot region that is produced above the flame when the burner is in use, it follows that the air admitted thereto is regeneratively heated and ascends naturally within the said chamber to the perforations in the intake chamber of the induction tube through which the said heated air passes or is drawn, and becomes influenced both by the ordinary pull or down-draft created by the flame at the burner nozzle and also by the injector-like action of the straight stream of gas that is projected axially from the gas-valve orifice. Further, the fact that the air passes through the contracting lower part of the cupped air-intake chamber $b^1$ to the narrower body of the tube insures that the same shall travel with an increased velocity down the said tube and thus set up an aspirative effect which augments the normal suction of the burner on the gas supply and assists the axial gas stream to act effectively for drawing-in or picking up the proper amount of air required for forming a mixture of correct proportions and suitable to the prevailing demand at the point of ignition. And the fact that the improved gas-admission valve keeps the gas stream axial and equi-distant from all the air-inlet holes in the intake chamber of the induction tube insures that the inductive effect thereby exerted acts equally at all the said inlets and the quantity of air drawn in always correctly proportioned to the gas supply as determined by the service pressure, the adjustment of the gas-inlet valve, and the demand for mixture at the flame.

The air-jacket casing, or the lower part thereof may have a wire gauze lining $e^4$, whose lower end is in heat-conducting contact with the top of the mixing chamber while its upper part covers the air intake so that the air passing therethrough plays on the gauze and is warmed by contact with the conduction-heated wires thereof.

The lower end of the induction tube may be arranged to deliver the gas and air into any suitable construction of expansion and mixing chamber which will insure the formation of a thoroughly incorporated and atomized mixture. Preferably however, the gas and air are made to pass first through a system of primary expansion and atomizing devices that are attached to the induction tube and proceed thence to a larger secondary expansion and superheating chamber $c$ having a gradually contracting bottom outlet leading to the burner nozzle $c^1$. Two alternative arrangements of primary atomizers are shown in the drawings, one in Figs. 1 to 5, and another in Figs. 6 and 7. Describing first the arrangement shown in Figs. 6 and 7; in order to compel the gas and air to travel in a circuitous path, from the induction tube, through the system of expansion chambers and atomizers on its way to the nozzle $c^1$, the bottom end of the said tube is closed at $b^2$, but the adjacent walls are slotted to form a series of outlets $b^3$ that communicate with the outer or secondary expansion chamber and super-heater $c$ by way of an intermediate or primary expansion chamber $h$ which is of a cup shape or has a curved bottom $h^1$, and entirely incloses the lower extremity of the tube so that the gas and air can only pass to the larger and secondary expansion chamber $c$ by way of the said primary or intermediate chamber, whose walls are formed with a plurality of upright outlets and atomizing slots $h^2$. The outlets $b^3$ in the lower part of the induction tube extend nearly to the extreme bottom of the primary or intermediate expansion chamber $h$; and they are adapted to serve as initial atomizers whereby the incorporation of the issuing gas and air is started by their passage through the said outlet slots $b^3$. Or instead of these apertures being in the form of slits, as shown, a sleeve of wire gauze or the like may be applied to the extremity of the induction tube to give the initial atomizing effect. The mixture, on issuing from such initial atomizer into the intermediate expansion chamber, is deflected upward by the curved bottom walls $h^1$ of the said chamber and then drawn through the other and larger number of small atomizing and mixing slits or apertures $h^2$ which are formed in the walls of the upper part of the said primary or intermediate chamber. The passage of the mixture through the second set of apertures or perforations completes the incorporation and atomization of the same and on reaching the outer chamber $c$, which is situated in an extremely hot area immediately above the burner flame, the perfected mixture is further expanded and superheated before being drawn, at high velocity, through the contracting bottom outlet to the burner nozzle. A guard plate or deflector $i$, is mounted on the top of the chamber $c$ and has inclined lips or leads $i'$ at its outer edges for directing the ascending fumes angularly away from the air inlets. This same plate is also furnished with a curved tongue or extension piece $j$ that is adapted to come underneath the bend of the gas supply arm $k$, and to serve as a shield for protecting the said arm from the heat and preventing discoloration or the like. This guard plate is adjustable, or can be rotated or turned relative to the body of the burner so that if, when screwing home the burner fitting in attaching the same to a gas supply arm, the extension of the guard does not come in the correct position underneath the bend of the said pipe, the said guard can be turned around independently until its extension comes properly underneath the said bend and shield, as shown in Fig. 1. The two deflector lips or wings and the shield extension of the guard plate are preferably arranged triangularly, relative to one another, the said shield being curved or bent, as represented in Fig. 1, to approximate to the curvature of the arm which it is adapted to protect.

The atomizing arrangements shown in Figs. 1 to 5 are adapted to effect the atomization and incorporation of the gas and air by compelling the same, as they issue from the lower part of the induction tube, to spread laterally and also to travel in circuitous but lateral directions to the chambered or enlarged upper part of the burner nozzle wherein the mixing devices are inclosed. Thus, I propose to close the bottom of the induction tube at $b^2$ and to provide, in the walls of the lower part of the said tube and above the said closed end, a series of upright slots or orifices $b^3$ of suitable shape wherethrough the gas and air issues and is subjected to the initial incorporation. This slotted or perforated lower part of the tube is surrounded by a cage $h^3$, which is closed at both ends, while its walls are provided with a plurality of piercings, slots or orifices $h^4$, which are disposed horizontally or in planes at right angles to the upright slots or orifices $b^3$ of the induction tube. The cage $h^3$ is surrounded, in turn, by an intermediate expansion chamber $h$, with slots $h^2$ in the walls, like those of the similar chamber shown in Figs. 12 and 13, the arrangement being such that the gases (or the initial mixture) proceed laterally from the tube slots to the slots in the cage, which by reason of the increased number of the last mentioned slots, and their disposition relative to the said tube slots further breaks up or atomizes and incorporates the said mixture as it proceeds into the primary expansion chamber $h$ while the perfection of the said mixture is completed by its passage through the slots $h^2$ of the chamber $h$ into the enlarged upper part of the burner nozzle wherein the above mentioned devices are inclosed. The slotted cage may be mounted around the slotted end of the induction tube in any convenient manner, but the bottom part is closed so as to prevent the initial mixture being drawn direct into the contracted part of the nozzle and this bottom of the cage may be provided or armed, on its underside, with a suitably attached disk or shield of asbestos or similar insulating or non-conducting material which, in a measure, isolates the bottom of the induction tube from the extreme heat of the inverted burner flame and prevents the "burning" of the oxygen of the air out of the mixture in the induction tube prior to mixture reaching the point of ignition.

Instead of the slotted end of the burner tube being surrounded solely by a cage such as above described, the same may be also surrounded by one or more intermediate or additional sleeves having their perforations arranged in any suitable manner which will compel the mixture to proceed circuitously, either in a lateral direction, or in an upward and downward direction, to the intermediate or primary mixing chamber whose slotted outlets cause the same to also act as a spreader. In case the gases are to spread laterally, the perforations in the intermediate sleeve or sleeves are arranged in the same plane, or approximately so, as those in the induction tube and outer cage, whereas if the gases are required to proceed in the upward and downward direction, the sleeve perforations are arranged above or below or both above and below those in the said tube and cage.

Having fully described my invention, what I desire to claim and secure by Letters Patent is:—

1. In an inverted incandescent gas burner, in combination, an induction tube into which air and gas are delivered, the tube being closed at its lower end and above its closed lower end being provided with perforations, a cage-like member surrounding the lower end of the tube and affording a primary mixing chamber, the member being closed except for perforations through whch the products issuing from the induction tube pass laterally, and a superheating chamber surrounding the cage-like member and into which the products issuing laterally from said member pass, the chamber affording a secondary mixing and expansion chamber and having an outlet which leads to the burner nozzle.

2. In an inverted incandescent gas burner, in combination, an induction tube into which air and gas are delivered, the tube being closed at its lower end and above its closed lower end being provided with perforations, cage-like members concentrically spaced from one another and concentrically surrounding the tube, the members having perforations so arranged that the products passing through the perforations in the lower end of the tube are spread laterally and travel in a tortuous manner, and a superheating chamber surrounding the cage-like members and into which the products issuing laterally from said members pass, the chamber affording a final mixing and expansion chamber and having an outlet which leads to the burner nozzle.

In testimony whereof I, the said KATE DARWIN, as administratrix, have hereunto set my hand in presence of two subscribing witnesses.

KATE DARWIN,
*Administratrix of the estate of Harry Darwin, deceased.*

Witnesses:
HENRY SKERRETT,
HENRY NORTON SKERRETT.

---

Copies of this patent may be obtained for five cents each, by addressing the "Commissioner of Patents, Washington, D. C."